Nov. 10, 1936.     G. E. EVANS     2,060,292
PISTON
Filed Jan. 30, 1926
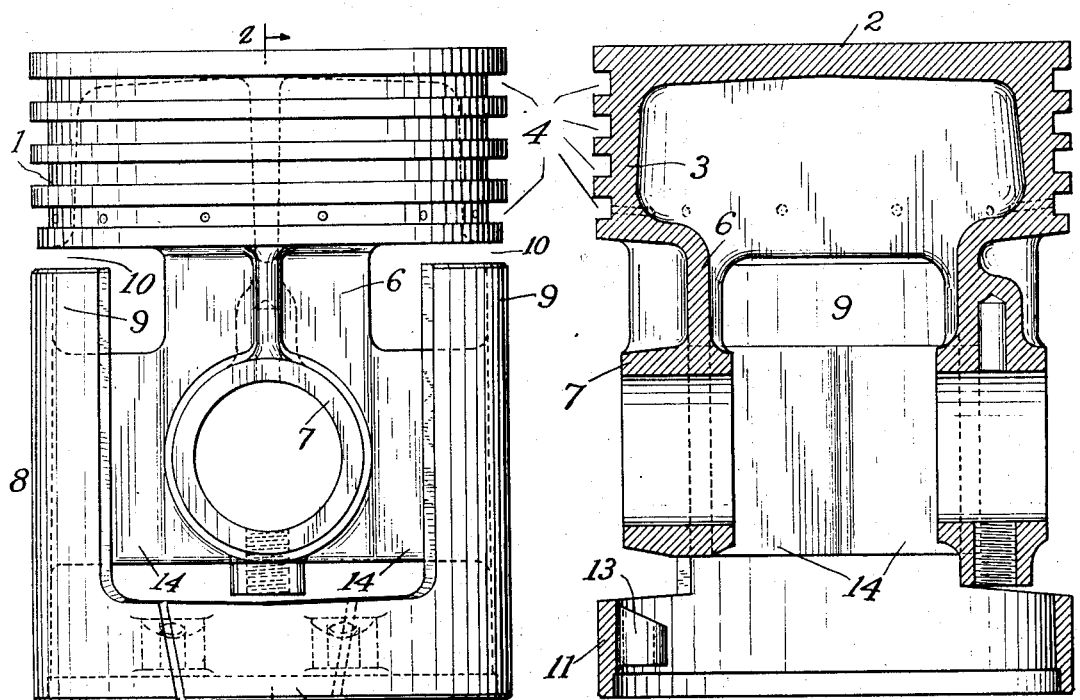
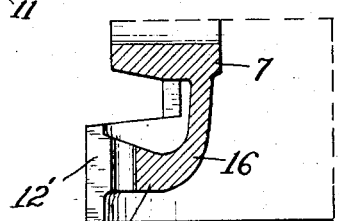
Fig. 5
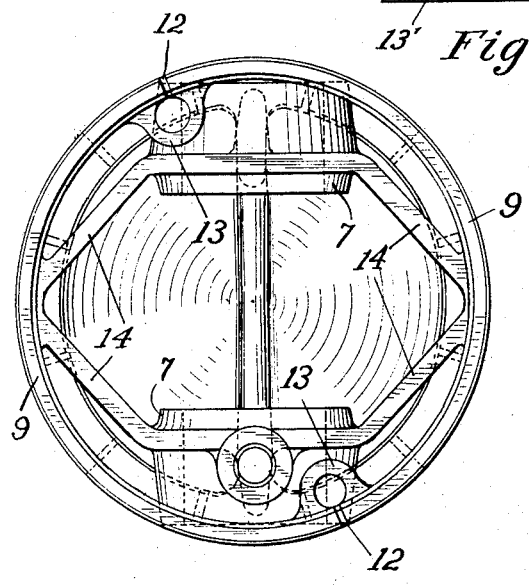
Fig. 3
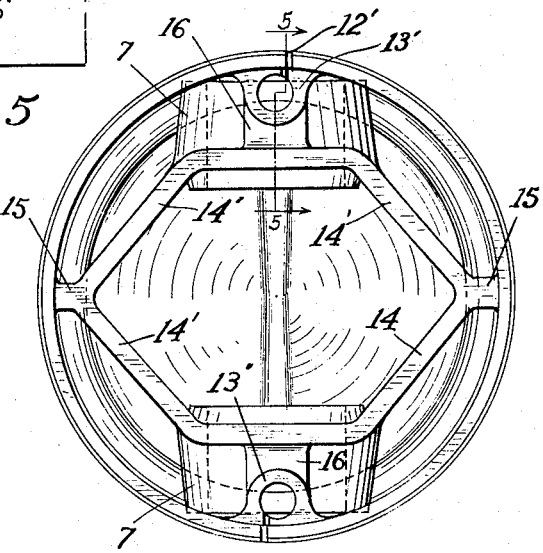
Fig. 4
INVENTOR
Gordon E. Evans
BY
Richey & Watts
ATTORNEYS Patented Nov. 10, 1936

2,060,292

UNITED STATES PATENT OFFICE 2,060,292

PISTON

Gordon E. Evans, Cleveland, Ohio, assignor, by mesne assignments, to The Cleveland Trust Company, Cleveland, Ohio, a corporation of Ohio, trustee Application January 30, 1926, Serial No. 84,894

18 Claims. (Cl. 309—11)

This invention relates to pistons for internal combustion engines and particularly pistons composed of material having a high coefficient of expansion than the coefficient of expansion of the cylinder in which the piston is to operate. It is well known that pistons for internal combustion engines, when composed of material having a higher coefficient of expansion than that of the material comprising the cylinder in which the piston is to operate, exhibit a tendency to stick in the cylinder under operating temperatures or to slap at the lower temperatures depending on whether or not the piston is fitted to the cylinder at ordinary temperatures with a clearance of less than or greater than certain permissible limits. For instance, an aluminum alloy piston having a diameter of about 3 inches may require about .0055 inch clearance, when assembled in a cast iron cylinder, when the piston is to operate without scoring or sticking in the cylinder. With such clearances or greater clearances, the pistons often exhibit a tendency to slap at ordinary room temperature or temperatures approaching zero.

It has ben suggested that the normal necessary clearance might be decreased by so constructing the piston that expansion thereof along one diameter, where an enlarged clearance was provided, would result in a decreased diameter at right angles thereto, and pistons embodying such ideas have been constructed with an enlarged clearance about the bosses and with the bearing walls at right angles to the line of the bosses being separated from direct contact with the head by narrow splits in the piston or air gaps. Such attempts have, however, met with varying successes and have presented such difficulties as flattening out of the normal curvature of the bearing faces, increased bearing at isolated points on the bearing surfaces and bearing surfaces of smaller circumferential dimensions at the end near the head of the piston than at the open end of the skirt.

I have discovered that it is possible to construct a piston in which the diameter decreasing action of the prior art pistons may be combined with other structural features which will decrease the adnormal wear experienced with the prior art pistons at various points on the skirt, which has necessitated either diminishing the circumferential dimensions of the bearing surfaces or a flattening of the normal curvature of the bearing surfaces. My invention further contemplates the supporting of the bearing walls of a piston skirt by resilient means which are flexible or deformable under the side thrust of the piston against the cylinder walls, during operation, sufficiently to prevent scoring of the piston even when it is fitted to the cylinder with extremely small clearances.

In the drawing attached to and forming a part of this specification:

Fig. 1 is a side elevation of one form of piston embodying my invention;

Fig. 2 is a vertical section taken on line 2—2 of Fig. 1;

Fig. 3 is an open end view of the piston shown in Fig. 1;

Fig. 4 is a view similar to Fig. 3 of a slightly modified form of piston, and Fig. 5 is a fragmentary section on line 5—5 of Fig. 4.

The piston shown in the drawing comprises a head 1 which includes a disc 2 and a depending ring flange 3 provided with ring grooves 4 to receive packing rings (not shown). From opposite sides of the head, boss carrying walls 6 depend, each wall being provided with a boss 7 aligned to receive the usual wrist pin (not shown). The skirt 8 consists of two oppositely disposed bearing walls 9, each separated from the ring flange by a split or air gap 10 and preferably joined to each other below the bosses by circumferentially extending, relatively narrow bearing walls 11 separated from each other by a split 12, which split is spanned by a resilient and flexible arch 13.

Preferably the bearing walls 9 are spaced apart from the boss carrying walls by air gaps. Integral with the bosses and boss carrying walls are resilient webs 14 which extend to and unite preferably throughout a considerable part of the vertical length of the skirt, with the bearing walls along the substantially longitudinal medial line thereof that is preferably at a point about midway between the side edges of the bearing walls. By referring to Fig. 3 it will be seen that in the first embodiment here illustrated, the webs join the bearing walls approximately at the ends of a center line drawn through the piston at right angles to the longitudinal center plane passing through the bosses, the webs being elsewhere spaced from the bearing walls.

In the form shown in Figs. 4 and 5 the webs join each other within the hollow of the skirt and are connected to the bearing walls as shown at 15.

If desired, webs 16 may depend from the bosses or boss carrying walls and curve outwardly to engage with the arches 13'.

In operation, a piston construction as above described is believed to act substantially as follows: As the head expands thermally, the boss carrying walls and bosses will be carried along therewith and hence be moved radially outwardly to a certain extent. Coincident with such outward movement, if and when it occurs, the webs will likewise be moved and will exert tensile stresses on the oppositely disposed bearing walls, tending to draw these walls inwardly. By reason of the disposition and formation of the webs, the resultant pressure of the inward forces exerted by two of the webs on either bearing wall would be in the embodiments shown, along a diameter of the piston located at substantially right angles to the center line of the bosses. Such inwardly directed movement of the bearing walls will tend to decrease the diameter thereacross, thus enabling a piston to be fitted at ordinary temperatures with less clearance than heretofore without danger of seizing.

The resultant webs are preferably resilient or deformable in character, due partly to their shape and partly to the thickness of metal contained therein, and in practice have been found to permit inward yielding or movement of the bearing walls under excessive thrusts exerted by the bearing walls against the cylinder wall, or vice versa as well as by thermal expansion of the bearing walls against the cylinder walls. The webs are so formed that they will yield under forces less than the forces which cause undue wear or even scoring of the bearing walls.

By referring to the drawing, it will be noted that the bearing walls are of substantially the same circumferential dimensions at the end adjacent the head as at the lower end. With pistons as herein described, I have found that bearing walls of up to or even beyond 90° in circumference may be operated without any evidence of undue wear in the upper corners or at the point of contact of the bearing walls with the supporting webs.

The webs which join the lower portions of the bearing walls to the bosses serve as conductors of heat to lead undue amounts of heat away from the bosses and dissipate it through the bearing walls of the skirt. When these walls terminate in the resilient arches, they serve also to steady and support the bearing walls against thrusts in the line of the wrist pin, while at the same time acting resiliently to connect the bearing walls and permit the same to flex under thermal changes without causing scoring of the piston or cylinder.

Having thus described my invention so that others skilled in the art may be enabled to practice the same, what I desire to secure by Letters Patent is defined in what is claimed, it being understood that changes and alterations may be made in the specific embodiment of my invention hereinabove described without departing from the spirit and scope of my invention.

What is claimed is:

1. A piston comprising a head, boss carrying walls depending from the head, a skirt including two oppositely disposed bearing walls separated by an air gap from direct contact with the head and having spaced longitudinal side edges in the region of said boss carrying walls, and flexible skirt carrying webs disposed within the skirt and extending from the bearing walls intermediate the longitudinal side edges thereof to the bosses, said webs and boss carrying walls forming a circumferentially continuous structure.

2. A piston comprising a head, boss carrying walls depending from the head, a skirt including oppositely disposed bearing walls flexibly connected to each other by bearing walls below the bosses, the said skirt being spaced apart from direct contact with the head by air gaps and spaced apart from the boss carrying walls by air gaps, and resilient flexible webs joining the boss carrying walls and the bearing walls, the said webs being integrally united to the bearing walls along the ends of a longitudinal plane disposed at a right angle to the axis of the bosses and approximately midway between the bosses.

3. A piston comprising a head, diametrically opposite rigid walls depending therefrom and carrying wrist pin bearings, resilient walls extending laterally from said rigid walls and forming therewith a tube co-axial with the head, and bearing faces carried by said tube and attached thereto substantially at the ends of a diameter normal to the axis of said wrist pin bearings.

4. A piston comprising a head, a continuous substantially tubular support below the head and connected thereto by means positively causing one diameter of the support to vary as that of the head varies, and bearing faces carried by the support at the ends of a diameter thereof normal to said first mentioned diameter.

5. A piston comprising a hollow hexagonal prism, two bearing faces carried by opposite corners of said prism, two bosses carried by the sides of the prism intermediate said corners, and a head co-axial with said prism and rigidly connected to the boss carrying sides thereof.

6. A one-piece piston comprising a head having depending wrist pin bearings, a skirt having separate sections spaced from each other by air gaps adjacent the wrist pin bearings, a tubular support connected to said faces and to the head, the connection to the head being adjacent the wrist pin bearing so that expansion of the head increases the width of the support in the direction of the axis of the wrist pin bearing.

7. A one-piece piston comprising a head, a skirt having bearing faces spaced apart from each other and from the head, a flexible tubular support connecting said faces together and means rigidly connecting the support to the head intermediate the bearing faces.

8. A piston comprising a head, a skirt having a substantially annular bottom provided with slits, arched bridges spanning the slits and upwardly extending bearing faces, a substantially tubular support connecting said faces together and means rigidly connecting the support to the head intermediate the bearing faces.

9. A piston embodying a cup shaped head, two diametrically opposite spaced apart supports extending downwardly from the bottom of said head, two wrist pin bosses secured to said supports, two slipper sections separate from said head and forming thrust faces for said piston, and two struts rigidly connected with and diverging from the medial portion of each slipper section and connected with the two wrist pin bosses, said struts being carried by the head only through said supports.

10. A piston embodying a head, two diametrically opposite wrist pin bosses secured to said head, slipper sections disconnected from said head forming thrust faces at the sides of said piston, and two divergent struts rigidly secured to each of said slipper sections at points inwardly from the side edges and connected with the respective wrist pin bosses, said struts being slightly flexible and arranged to exert a toggle action tending to draw said slipper sections inwardly as units and without distorting their cylindrical shape when said wrist pin bosses are moved apart by expansion of said head.

11. A piston embodying a head, two slipper sections separate from said head and forming thrust faces at opposite sides of said piston, two supporting members extending downwardly from opposite sides of said head between said slipper sections, and two divergent struts integrally connected at one end with each of said slipper sections at points between the two side edges thereof, and rigidly connected at their opposite ends with said supports the portions of the slipper section between the points of connection of said two struts being substantially non-flexible.

12. An alloy piston of the compensating type comprising a head, piston pin bosses integral with and depending from said head, a divided outer skirt free from said head, inner skirts separate from said head integral with said bosses, said inner skirts being spaced inwardly from said outer skirt and substantially co-axial therewith, and an integral connection between said inner skirts and said outer skirt in the region disposed at substantially 90° measured arcuately from the ends of a line taken centrally through said piston pin bosses.

13. An alloy piston of the compensating type comprising a head, a pair of oppositely arranged piston pin bosses integral with said head, an outer skirt entirely free from said head, inner skirts forming a tube separate from said head and co-axial with said outer skirt, integral connections between said inner skirts and bosses, and integral connections between said inner skirts and outer skirt, said outer skirt being divided on the pin boss sides thereof below the pin bosses in regions substantially equidistant between the points of connection between said inner skirts and said outer skirt.

14. A piston comprising a head having a depending ring flange, wrist pin boss carrying walls depending from and rigid with said ring flange and a skirt including a lower substantially circular portion and a pair of oppositely disposed spaced upwardly projecting tongues constituting bearing faces, said bearing faces being spaced at their upper edges from said ring flange, and a pair of substantially vertically extending webs integrally connected to each of said bearing faces near the center thereof and diverging inwardly and integrally joined to said boss carrying walls, at least one of said bearing faces being circumferentially continuous and unslotted and the webs connecting said bearing face to said boss carrying walls being sufficiently flexible to act as toggles upon separation of said bosses due to the expansion of said head and thereby mechanically pull said bearing face toward said bosses.

15. A piston designed for operation in a cast iron engine cylinder and composed of a single piece of aluminum alloy having a relatively high co-efficient of thermal expansion with respect to the cylinder, said piston comprising a head having a depending ring flange, wrist pin boss carrying walls depending from and rigid with said ring flange and a skirt including a lower substantially circular portion and a pair of oppositely disposed spaced upwardly projecting tongues constituting bearing faces, said bearing faces being spaced at their upper edges from said ring flange, and a pair of substantially vertically extending webs integrally connected to each of said bearing faces near the center thereof and diverging inwardly and integrally joined to said boss carrying walls, at least one of said bearing faces being circumferentially continuous and unslotted and the webs connecting said bearing face to said boss carrying walls being sufficiently flexible to act as toggles upon separation of said bosses due to the expansion of said head and thereby mechanically pull said bearing face toward said bosses, and said skirt being formed with a slot therethrough arranged to partially close to accommodate such movement.

16. A piston comprising a head, boss carrying walls depending from the head a skirt including two oppositely disposed bearing walls separated by an air gap from direct contact with the head and having spaced longitudinal side edges in the region of said boss carrying walls, and flexible skirt carrying webs disposed within the skirt and extending from the bearing walls intermediate the longitudinal side edges thereof to the bosses, said webs and boss carrying walls forming a substantially hexagonal tube.

17. A piston designed for operation in a cast iron engine cylinder and composed of a single piece of aluminum alloy having a higher coefficient of thermal expansion than the cylinder, said piston including a head having a depending ring flange, boss carrying walls depending from and rigidly connected to said ring flange, and a skirt including a pair of oppositely disposed bearing faces spaced from each other in the region of said bosses and integrally connected together below said bosses, one of said bearing faces being spaced at its upper edge from said ring flange and being continuous in circumferential extent, and a pair of flexible webs integrally joined to said bearing face near the center thereof and diverging inwardly and integrally joined with said boss carrying walls, said webs diverging at an angle whereby to act as toggles and exert an inward pull upon said bearing face upon separation of said boss carrying walls due to expansion of said head.

18. A piston designed for operation in a cast iron engine cylinder and composed of a single piece of aluminum alloy having a higher coefficient of thermal expansion than the cylinder, said piston including a head having a depending ring flange, boss carrying walls depending from and rigidly connected to said head, and a skirt including a pair of spaced bearing faces, one disposed on each side of the piston between and spaced from said wrist pin bosses, said bearing faces being integrally connected together below said bosses, and said bearing faces being spaced at their upper edges from said ring flange and being continuous in circumferential extent, and a pair of flexible webs integrally joined to each of said bearing faces near the center thereof and diverging inwardly and integrally joined with said boss carrying walls, said webs being arranged to act as toggles to exert an inward pull upon each of said bearing faces upon separation of said boss carrying walls due to expansion of said head.

GORDON E. EVANS.